J. SHOOS.
CHAIN STRETCHER.
APPLICATION FILED MAR. 17, 1915.

1,155,520. Patented Oct. 5, 1915.

Witnesses
R. F. Takács
Milton E. Lowry

Inventor
J. Shoos

By
A. M. Wilson
Attorney

UNITED STATES PATENT OFFICE.

JOSEPH SHOOS, OF ROSETON, NEW YORK.

CHAIN-STRETCHER.

1,155,520. Specification of Letters Patent. Patented Oct. 5, 1915.

Application filed March 17, 1915. Serial No. 15,019.

*To all whom it may concern:*

Be it known that I, JOSEPH SHOOS, a subject of the King of Hungary, residing at Roseton, in the county of Orange and State of New York, have invented certain new and useful Improvements in Chain-Stretchers, of which the following is a specification.

This invention relates to certain new and useful improvements in chain stretchers.

An object of the present invention is to provide a device adapted to draw together the meeting ends of a chain, so that the said meeting ends may be held in juxtaposition while the same are being connected as by a rivet used in connection with sprocket chains.

A further object of the invention is to provide a chain tightener especially adapted for sprocket chains and which is designed to bring to meeting position the ends of the sprocket chain so that the sections forming the links may be held in position by the device and to accommodate the use of both hands in the joining of the ends.

With the above general objects in view and others that will appear as the nature of the invention is better understood, the same consists in the novel construction, combination and arrangement of parts to be hereinafter more fully described and then claimed.

Figure 1:
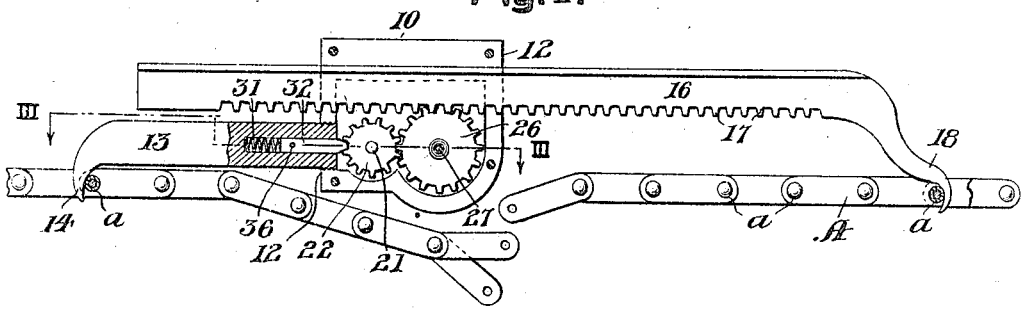
Figure 2:
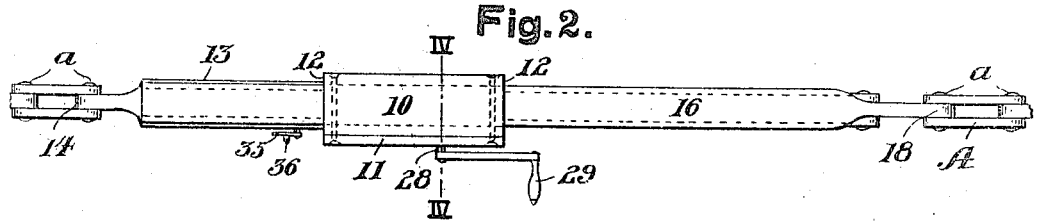
Figure 3:
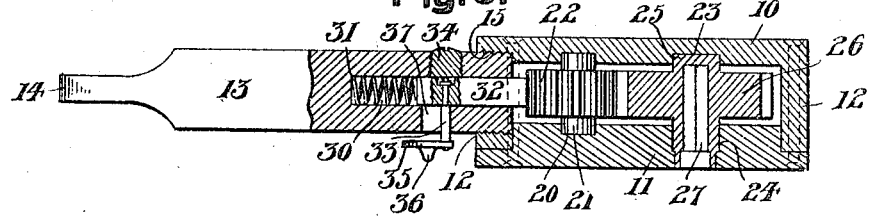
Figure 4:
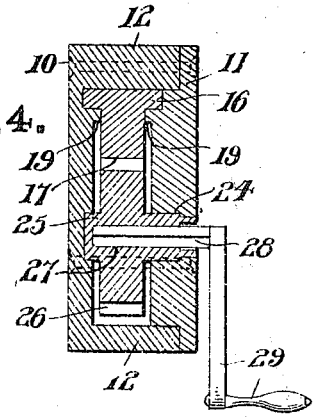

In the accompanying drawing forming a part of this application and to which reference is had herein by like characters designating corresponding parts throughout the several views: Figure 1 is a side elevational view, partly in section of the chain stretcher with a portion of the chain shown to illustrate its use. Fig. 2 is a top plan view of the same. Fig. 3 is a longitudinal sectional view taken on lines III—III of Fig. 1, and Fig. 4 is a cross sectional view taken on line IV—IV of Fig. 2.

The present invention aims to provide a device that will hold in juxtaposition the meeting ends of a chain, and preferably a sprocket chain, when it is desired to repair the same as by riveting together the meeting end of the chain.

The device comprises in detail, a housing formed of side members 10 and 11 suitably bolted together and constituting a housing for the operating mechanism. The side member 10 is provided with integral bottom, top and end walls 12 and has a threaded opening provided in one end wall thereof for the reception of the arm 13 provided with a hook 14 at its free end, the entering end of said arm being externally threaded as at 15 for engagement with the threaded opening in the end wall of the side member 10. There is provided a rack bar consisting of an angle iron 16, T-shaped in cross section and provided on the lower edge of the web portion thereof with a series of rack teeth 17, which extend throughout the major portion of its length, while one end of the rack bar 16 is provided with a hook 18. The rack bar 16 is slidably mounted within the housing and has the flanges constituting the head of the T resting on opposed flanges 19 formed on the inner faces of the side members 10 and 11, as clearly illustrated in Fig. 4 with the overhanging top wall 12 of the side member 10 engaging the upper surface of the rack bar 16.

The opposed faces of the side members 10 and 11 are provided with sockets 20 for the reception of studs 21 that support the pinion 22. In horizontal alinement with the sockets 20 is another socket 23 formed in the side member 10 and opposing the socket 23 is an opening 24 in the side member 11, the socket 23 and opening 24 constituting supports for the hub portion 25 of the gear wheel 26. The hub portion 25 is provided with a rectangular bore 27 for the reception of a similarly shaped key 28 carried by the operating handle 29, it being noted that the pinion 22 and gear wheel 26 have their teeth meshing.

The arm 13 is provided with a longitudinal recess 30 opening into the housing and seated in said recess is a compression coil spring 31 adapted to engage the pin 32 and force the outer end thereof into engagement with the teeth of the pinion 22. Means are provided to hold the pin 32 retracted from position with the pinion teeth and consists of a transverse arm 33 having the inner end received in a recess provided in the pin 32 and closed by the screw plug 34 mounted in the arm 13 while the outer end of the arm 33 carries a cam member 35 adapted to be brought into engagement with the end wall of the side member 10 and operated by the finger grip 36.

The operation will be described as follows:—By reference to Fig. 1, it will be noted that I have shown a portion of a sprocket chain A including the detached meeting ends thereof in operative relation to the present chain stretcher. The hook 14 of the arm 13 is caught in a rivet —a— of the chain adjacent one end thereof, while the hook 18 of the rack bar 16 similarly engages one of the link rivets of the other end of the chain. The cam member 35 operated by the finger grip 36 is moved to engaging position with the end wall 12 of the side member of the housing and further movement of the same into positive engagement with the said end wall will cause the pin 32 to be retracted from the teeth of the pinion 22 against the tension of the spring 31 and during such movement, the arm 33 moves in the slot 37 in the arm 13. In this position it is only necessary to operate the handle 29 to revolve the gear 26 and this gear 26 meshing with the teeth 17 of the rack bar 16 will tend to move the hook members 14 and 18 toward each other and thereby stretch the chain or bring the meeting ends thereof into closer relation for purposes of riveting or in any other manner repairing the same. When the proper tension has been placed upon the chain A, the cam member 35 is released from the end wall and the spring 31 in exerting its pressure will force the pin 32 into locking engagement with the pinion 22 and thereby hold in locked position the gear 26 and rack bar 16 to thereby prevent relative movement of the hooks 14 and 18.

What I claim as new is:—

1. In a device of the class described, a housing, a rack bar slidably mounted in said housing, a hook carried by one end of the rack bar, an arm mounted in said housing, a hook carried by the free end of said arm, a gear wheel in mesh with said rack, a pinion in mesh with said gear wheel, a spring pressed pin adapted to engage said pinion to arrest movement thereof, and an operating handle for said gear wheel.

2. Means for stretching a chain comprising a pair of hook members, a spring-pressed pin carried by one of said members, a rack bar carried by the other of said members, a supporting housing, meshing gearing within said housing adapted to be engaged by said spring pressed pin, and means for operating said gearing.

3. A device of the class described, comprising a housing, a hooked arm fixed to said housing, a second hooked arm slidably mounted within said housing and provided with rack teeth on its lower edge, a gear in mesh with said rack teeth, a pinion in mesh with said gear, a spring pressed pin adapted to engage said pinion to arrest movement thereof, a cam member carried by said spring pressed pin and adapted to be moved to position to engage said housing to hold the pin retracted from engagement with the pinion.

4. A device of the class described comprising a housing, an arm mounted in one end of said housing, a hook carried by the free end of said arm, there being a recess in said arm opening into said housing, a spring pressed pin mounted in said recess, meshing gearing within said housing, a rack bar within said housing meshing with said gearing, a hook carried by the free end of said rack bar, and a cam member associated with said spring pressed pin adapted to hold the same retracted from said meshing gear.

5. A device of the class described comprising a supporting housing, a pair of hook members associated with said housing, means for moving one of said hook members, a locking member for the moving means, a cam member carried by the locking member adapted to be moved to engaging position with the housing to hold the locking member in inoperative position.

In testimony whereof I affix my signature in presence of two witnesses.

JOSEPH SHOOS.

Witnesses:
A. M. BROWN,
R. B. TAKAIS.

Copies of this patent may be obtained for five cents each, by addressing the "Commissioner of Patents Washington, D. C."